United States Patent [19]

Faulstich

[11] Patent Number: 5,289,912
[45] Date of Patent: Mar. 1, 1994

[54] ANIMAL CONFINEMENT BUILDING CLEANING SYSTEM

[76] Inventor: Eugene W. Faulstich, P.O. Box 248, Ruthven, Iowa 51358

[21] Appl. No.: 942,581

[22] Filed: Sep. 9, 1992

[51] Int. Cl.⁵ .............................................. B65G 19/00
[52] U.S. Cl. ..................................... 198/718; 198/748; 119/28
[58] Field of Search ............... 198/718, 741, 742, 746, 198/748; 119/16, 22, 28

[56] References Cited

U.S. PATENT DOCUMENTS

| | | | |
|---|---|---|---|
| 2,552,743 | 5/1051 | Simpson | 198/748 |
| 2,554,589 | 5/1951 | Patz et al. | 74/249 |
| 2,752,029 | 6/1956 | Hammond | 198/748 |
| 2,785,790 | 3/1957 | Bruecker | 198/224 |
| 3,093,110 | 6/1963 | Evans | 119/52 |
| 3,343,521 | 9/1967 | Moores | 119/20 |
| 3,693,782 | 9/1972 | Thoennes | 198/748 |
| 3,827,402 | 8/1974 | Laurenz | 119/28 |
| 3,960,110 | 6/1976 | Laurenz | 119/28 |
| 4,067,297 | 1/1978 | Johnson | 119/16 |

*Primary Examiner*—Joseph E. Valenza
*Attorney, Agent, or Firm*—Zarley, McKee, Thomte, Voorhees, & Sease

[57] ABSTRACT

An animal confinement building includes an upper animal floor and a lower animal waste pit having a lower floor. Scrappers are mounted on a continuous cable movable back and forth the length of the lower pit floor. Controls for the cleaning system are mounted on a wall in the area of the upper floor out of the corrosive environment of the waste pit. A pair of cable stops are carried on the cable and operate limit switches which cause the motor to reverse directions and stop at the end of a completed cycle. A programmable control is provided for automatic operation of the cleaning system.

20 Claims, 2 Drawing Sheets

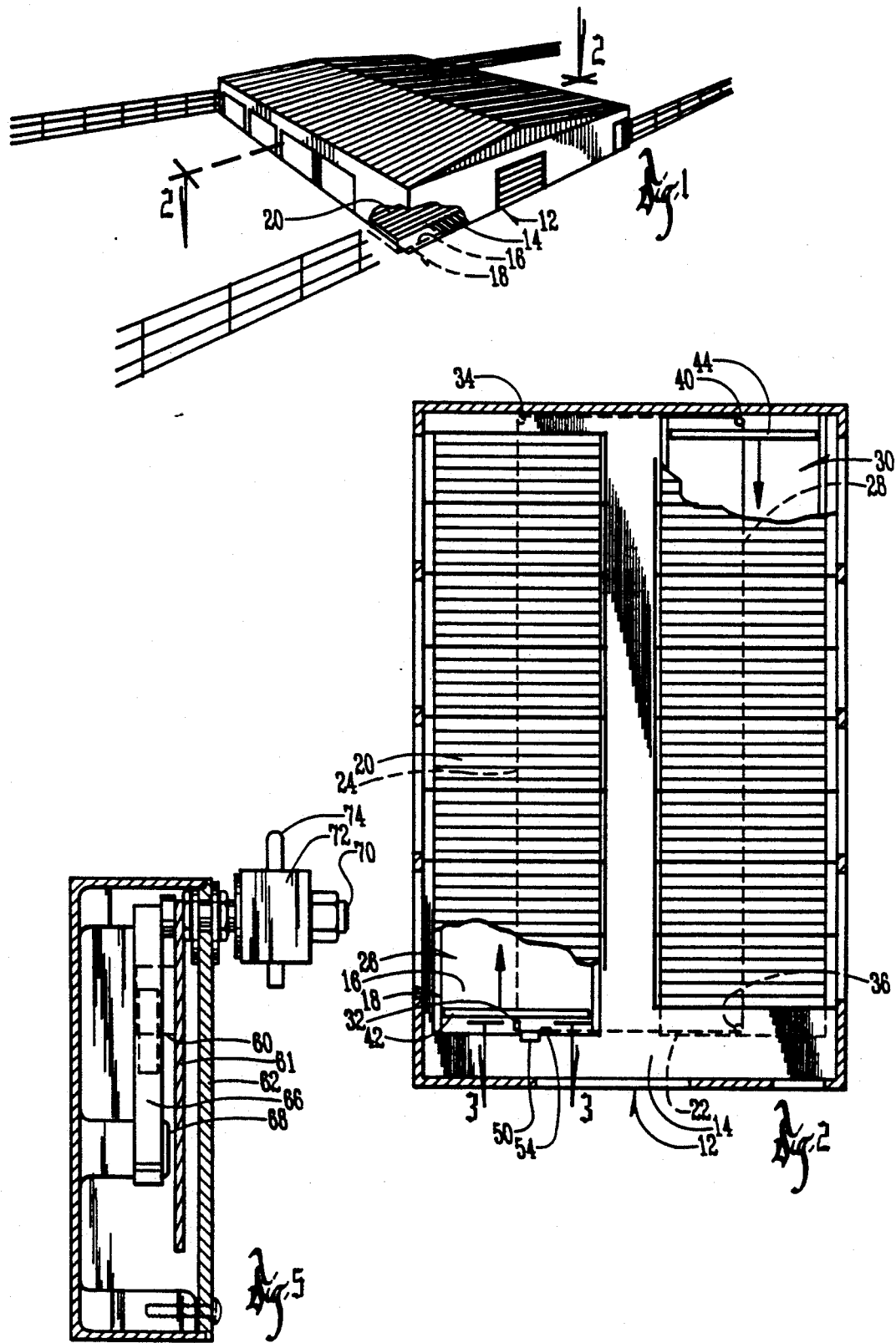

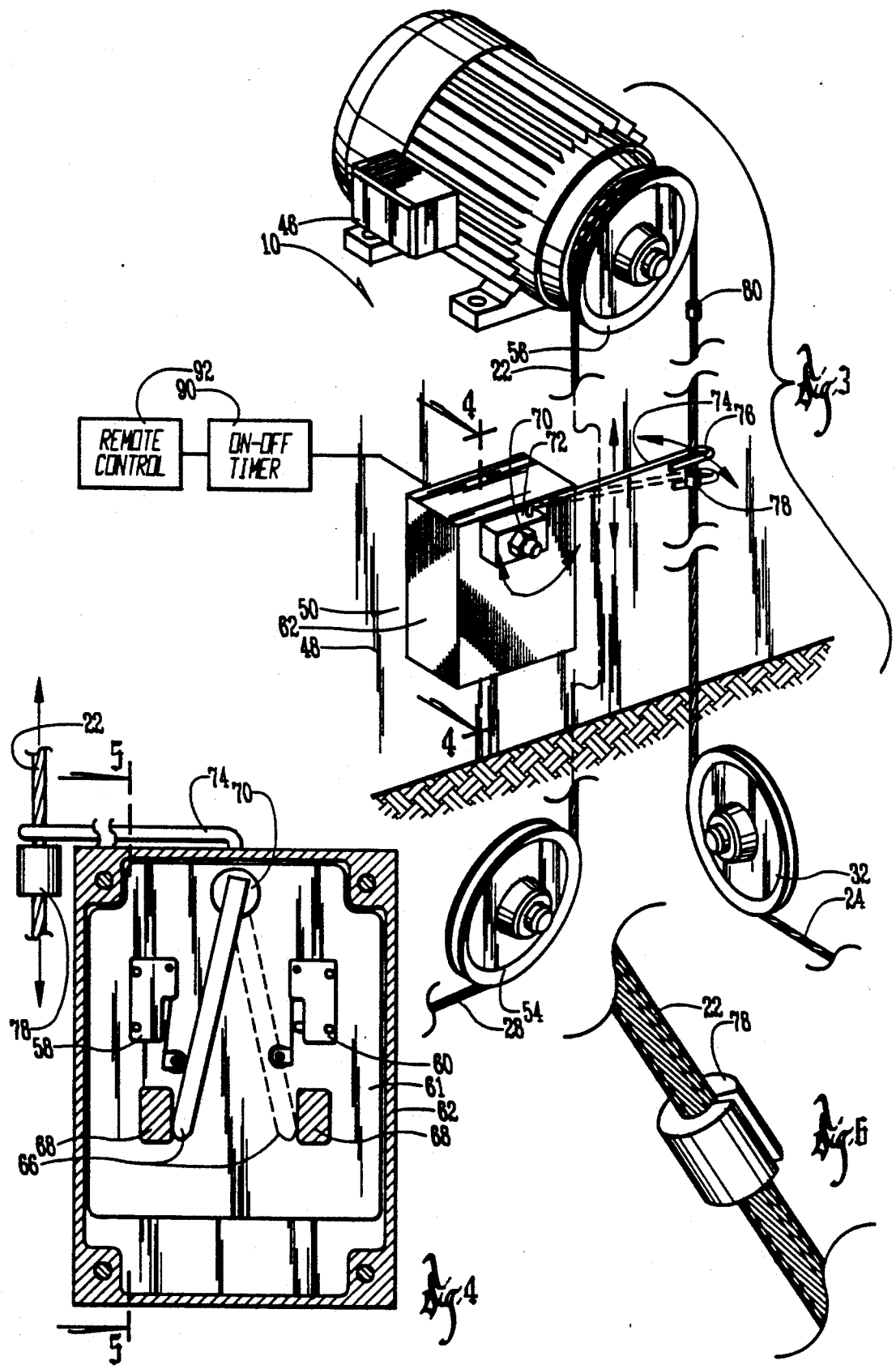

ANIMAL CONFINEMENT BUILDING CLEANING SYSTEM

BACKGROUND OF THE INVENTION

Animal confinement buildings such as hog facilities have an upper slatted floor for the animals and their waste drops through the slats into a pit on a lower floor. The waste material may be removed by a scrapper on a cable moving back and forth the length of the lower floor. Without electronic controls, this system wastes valuable time, because the operator must wait some ten to fifteen minutes for each sweep. If the system is unattended, the scrapper may strike the end of the building and damage the cable system. These systems are not automated because the limit switches would have to be located in the pit area where the acidity of the animal waste is too hostile for electronic switching.

Thus, a cleaning system for animal confinement buildings is needed that is automatic in operation but is free of maintenance problems due to adverse environmental conditions.

SUMMARY OF THE INVENTION

The electronic control of this invention is used in conjunction with a conventional livestock cleaning system which operates by a cable which moves back and forth over the floor of the animal waste pit and which is driven by a motor which is otherwise controlled by a manually operated reversing and off-on switch. The difference, however, is in the fact that electronic controls replace the manually operated controls for the reversing or on/off operation of this motor, and that these controls and their associated limit switches are mounted on a vertical wall substantially removed and remote to the acidic conditions in the pit rather than in the pit itself.

A pair of stops are crimped on the existing cable of the cleaning mechanism. These stops alternately actuate a lever having a J-shaped portion. The lever having a J-shaped portion is connected to an arm which moves back and forth between a pair of limit switches which are located inside a water tight enclosure. One limit switch reverses the mechanism and the other shuts it down. One cycle of operation is initiated by pressing a momentary switch or by a programmable controller which causes the cleaning mechanism to operate at a predetermined schedule.

A remote control is connected with simple thermostat wire and thus it can be located outside the animal confinement building. This control houses a momentary switch for initiating the cycle, a beeper which alerts the operator when the cleaning system is malfunctioning, and a green light which tells him that the electronic control is turned on. Thus it is seen that the operator can monitor the operation from a remote location in a clean environment.

An electronic circuit is used in an enclosure mounted on the wall away from the hostile environment of the pit but near the motor itself. This circuit responds to the limit switches and the remote control and turns the motor off and on. When the first crimp closes the reverse limit switch, the electronic circuit reverses the motor windings and also removes power for a predetermined period of time so that the motor has an opportunity to stop. Then power is applied and the motor pulls the cable to its opposite end. There the second crimp opens the shut down limit switch and power is removed. The circuit does not apply power to the motor again until the momentary switch is depressed or the programmable controller is actuated. An electronic overload is incorporated in the electronic control which monitors the motor current. When the current exceeds the normal current of the motor, as in an overloaded condition, the electronic control removes power and sounds the beeper which is located in the remote control.

DESCRIPTION OF THE DRAWINGS

FIG. 1 is a fragmentary perspective view of an animal confinement building having an upper animal floor and a lower animal waste pit floor.

FIG. 2 is a cross sectional view taken along line 2—2 in FIG. 1 showing the upper slotted animal floor and the lower animal waste pit floor.

FIG. 3 is a fragmentary enlarged perspective view taken along line 3—3 showing the cleaning system cable and control system.

FIG. 4 is a cross sectional view of the control housing taken along line 4—4 in FIG. 3.

FIG. 5 is a cross sectional view taken along line 5—5 in FIG. 4.

FIG. 6 is an enlarged perspective view of the cable having a crimped-on cable stop for operation of the limit switches.

DESCRIPTION OF PREFERRED EMBODIMENT

The cleaning system of this invention is generally referred to by the reference numeral 10 in FIG. 3 and is utilized in an animal confinement building 12 as seen in FIGS. 1 and 2.

The building 12 includes an upper animal floor 14 and a lower floor 16 of an animal waste pit 18. As seen in FIG. 2, the upper floor 14 comprises side by side spaced apart slats 20 between which the animal waste may drop to the lower floor 16 of the pit 18.

The cleaning system 10 as seen in FIG. 2 includes a continuous cable 22 which has a portion 24 extending the length of a first pit area 26 and a portion 28 extending the length of an adjacent second pit area 30. A sheave 32 is located at a first end of the first pit area 26 and a sheave 34 is located at the opposite end. A sheave 36 is located at the first end of the second pit area 30 with a sheave 40 at its opposite end. A scrapper 42 is connected to the cable 24 in the first pit area 26 while a scrapper 44 is connected to the cable 28 in the second pit area 30. The scrappers are at opposite ends of their respective pit areas and when one is moving in one direction, the other is moving in the opposite direction.

A motor 46 is connected to the cable 22 and is mounted on a vertical wall 48 above the lower floor 16 out of the pit area and is accessible from the upper floor 14. As seen in FIG. 2, controls 50 are also mounted on the vertical wall 48 on the upper floor 14.

As seen in FIGS. 2 and 3, the cable 22 completes its continuous loop by extending from the sheave 36 at the first end of the lower floor 16 to sheave 54 which directs the cable upwardly over a motor sheave 56 thence downwardly over the sheave 32 whereupon it returns to the opposite end of the building to extend over the sheave 34.

The controls 50 include pair of limit switches 58 and 60 mounted on a mounting plate 61 in a housing 62 as seen in FIG. 4. An actuating arm includes an arm portion 66 in the housing which move back and forth between the limit switches 58 and 60 but is limited by arm stops 68. The arm portion 66 pivots about an axis through a pivot shaft 70 as seen in FIG. 3 on which a block 72 is mounted. The block 72 carries a spring steel arm portion 74 which has a J-shaped hook portion 76 at its outer end which embraces the cable 22. The arm portion 74 is free to pivot laterally in a plane perpendicular to the plane of the cable such that it is self aligning with the cable.

A pair of cable stops 78 and 80 are crimped onto the cable 22 for engagement with the arm portion 74 to move it between the solid and dash line positions of FIG. 3.

Thus it is seen that the cable stop 78 has moved the arm portion 74 to the solid line position of FIGS. 3 and 4 and thus the limit switch 58 has been actuated which shuts off the power to the motor 46. Reactivation of the system will then cause the motor to reverse directions and when the scrappers 42 and 44 reach the opposite end of the building, the cable stop 80 will engage the arm portion 74 and move it to the dash line position whereby the arm portion 66 in the housing 62 will be in its dash line position engaging the limit switch 60 which simply reverses the direction of the motor 46 causing it to now move the scrapper blades 42 and 44 back to their original solid line positions as seen in FIG. 2.

The cable stops 78 and 80 are of such a size and shape that they will move easily over the various sheaves in the cleaning system. It is seen that all of the controls 50 including the motor 46 are out of the moist and acidic environment of the animal waste pits 26 and 30 and thus will operate substantially maintenance free.

The controls 50 optionally include a programmable controller such as an on/off switch and timer 90 and may also include a remote control 92 which could be located in another building such as the operator's home.

What is claimed is:

1. An animal confinement building cleaning system comprising,
    a building having an upper animal floor and a lower waste pit floor, and means for dropping animal waste from the upper floor to the lower floor,
    a cleaning system including a cable on which a scraper blade is connected extending the length of said lower floor, said scraper blade being movable between a first position at one end of said lower floor and a second position at the opposite end thereof,
    a control system having controls positioned remotely of said lower floor out of said waste pit,
    a motor power means connected to said cable out of said pit for moving said scraper between said first and second positions,
    said cable being continuous and extending over first and second sheave means at opposite ends of said lower floor and a third sheave means adjacent said controls, said cable having connected thereto first and second spaced apart stops,
    said controls including first and second spaced apart limit switches positioned adjacent said cable out of said pit,
    a first arm pivotable between first and second positions for alternately engaging and actuating said first and second limit switches, a second arm connected to said first arm and having an outer free end which embraces said cable, and
    said first and second stops being positioned on said cable for said first stop to engage said outer free end of said second arm when said cable is moving in a first direction and said scraper has reached said first position and said second stop to engage said outer free end of said second arm when said cable is moving in a second opposite direction and said scraper has reached said second position.

2. The structure of claim 1 wherein said controls are programmed to stop said motor power means when said first limit switch is activated by said first cable stop and reverse the direction of cable movement when said second limit switch is actuated by said second cable stop.

3. The structure of claim 1 wherein said first and second stops are small enough and have a shape which will permit them to move over said sheaves.

4. The structure of claim 1 wherein said first and second limit switches are positioned on a vertical wall and are accessible from the upper floor of the building.

5. The structure of claim 1 wherein said continuous cable at said one end of said lower floor extends upwardly around said third sheave means on a vertical wall on the upper floor, and said first and second limit switches being located on said vertical wall and accessible from said second floor.

6. The structure of claim 1 wherein said cable at the second end of said lower floor extends laterally around a fourth sheave means and then returns to the first end of said lower floor, and a second scraper is connected to said cable between said fourth sheave means and said first end of said lower floor, and said first and second scrapers are positioned to move simultaneously in opposite directions between said first and second ends of said lower floor.

7. The structure of claim 5 wherein said motor means is directly connected to said third sheave means to move said cable.

8. An animal confinement building cleaning system comprising, a building having a floor,
    a cleaning system including a cable on which a scraper blade is connected extending the length of said floor, said scraper blade being moveable between a first position at one end of said floor and a second position at the opposite end thereof,
    a control system having controls positioned remotely of said floor,
    a motor power means connected to said cable for moving said scraper between said first and second positions,
    said cable being continuous and extending over first and second sheave means at opposite ends of said floor and a third sheave means adjacent said controls, said cable having first and second spaced apart stops connected thereto,
    said controls including first and second spaced apart limit switches positioned adjacent said cable,
    a first arm pivotable between first and second positions for alternately engaging and actuating said first and second limit switches, a second arm connected to said first arm and having an outer free end which embraces said cable, and
    said first and second stops being positioned on said cable for said first stop to engage said outer free end of said second arm when said cable is moving in a first direction and said scraper has reached said first position, and said second stop to engage said outer free end of said second arm when said cable is moving in a second opposite direction and said scraper has reached said second position.

9. The structure of claim 8 wherein said third sheave means and controls are located on a vertical wall at said one end of said floor substantially above said floor.

10. The structure of claim 9 wherein said cable at the second end of said floor extends laterally around a fourth sheave means and then returns to the first end of said floor, and a second scraper is connected to said cable between said fourth sheave means and said first end of said floor, and said first and second scrapers are positioned to move simultaneously in opposite directions between said first and second ends of said floor.

11. A cable system including a cable on which a conveying means is connected, said conveying means being moveable between first and second positions, a motor power means connected to said cable for moving said conveying means between said first and second positions, said cable being continuous and having first and second spaced apart stops connected thereto, a control system having controls, said controls including first and second spaced apart limit switches, a first arm pivotable between first and second positions for alternately engaging and actuating said first and second limit switches, a second arm connected to said first arm and having an outer free end which embraces said cable, and said first and second stops being positioned on said cable for said first to engage said outer free end of said second arm when said cable is moving in a first direction and said conveying means has reached said first position, and said second stop to engage sad outer free end of said second arm when said cable is moving in a second direction opposite said first direction and said conveying means has reached said second position.

12. The structure of claim 8 wherein the connection between said first and second arms allow for said second arm to pivot in a plane perpendicular to the plane of said cable whereby said second arm maintains alignment with said cable.

13. The structure of claim 8 wherein said first and second stops are small enough and have a shape which permits them to move over said sheaves and said first and second stops move over said sheaves at times during movement of said scraper between said first and second positions.

14. The structure of claim 13 and said first and second stops are cylindrical in shape and include an elongated slot through which said cable is received and said stops are crimped onto said cable whereby said stops will move with said cable.

15. The structure of claim 8 wherein said stops are cylindrical in shape and include a passageway which extends the axial length thereof, and an elongated slot through which said cable moves when said tops are mounted thereon, said slots being substantially closed after said stops have been mounted on said cable.

16. The structure of claim 8 wherein said outer free end of said second arm is J shaped.

17. The structure of claim 11 wherein the connection between said first and second arms allows for said second arm to pivot in a plane perpendicular to the plane of said cable whereby said second arm maintains alignment with said cable.

18. The structure of claim 11 wherein said cable system includes a sheave over which said cable extends and one of said first and second stops is small enough and has a shape which permits it to move over said sheave and said one of said first and second stops moves over said sheave at times during movement of said conveying means between said first and second positions.

19. The structure of claim 18 and said one of said first and second stops is cylindrical in shape and includes an elongated slot through which said cable is received and said one stop is crimped onto said cable whereby said one stop will move with said cable.

20. The structure of claim 11 wherein said stops are cylindrical in shape and include a passageway which extends the axial length thereof, and an elongated slot through which said cable moves when said stops are mounted thereon, said slot being substantially closed after said stops have been mounted on said cable.

* * * * *